United States Patent
Wang

(10) Patent No.: US 9,457,265 B2
(45) Date of Patent: Oct. 4, 2016

(54) METHOD AND DEVICE FOR AUTOMATICALLY PLAYING EXPRESSION ON VIRTUAL IMAGE

(71) Applicant: Tencent Technology (Shenzhen) Company Limited, Shenzhen (CN)

(72) Inventor: Dong Wang, Shenzhen (CN)

(73) Assignee: Tenecent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 14/129,636

(22) PCT Filed: Mar. 25, 2013

(86) PCT No.: PCT/CN2013/073131
§ 371 (c)(1),
(2) Date: Dec. 27, 2013

(87) PCT Pub. No.: WO2013/149556
PCT Pub. Date: Oct. 10, 2013

(65) Prior Publication Data
US 2015/0038222 A1 Feb. 5, 2015

(30) Foreign Application Priority Data

Apr. 6, 2012 (CN) .......................... 2012 1 0098817

(51) Int. Cl.
*A63F 9/24* (2006.01)
*A63F 13/213* (2014.01)
(Continued)

(52) U.S. Cl.
CPC ............. *A63F 13/213* (2014.09); *A63F 13/25* (2014.09); *A63F 13/655* (2014.09); *G06K 9/00281* (2013.01); *G06K 9/00315* (2013.01)

(58) Field of Classification Search
USPC ........................................................ 463/42
See application file for complete search history.

(56) References Cited

U.S. PATENT DOCUMENTS 8,649,572 B2 * 2/2014 Gokturk ...................... 382/118
2005/0151743 A1 * 7/2005 Sitrick ................... G09G 5/377
345/473

(Continued)

FOREIGN PATENT DOCUMENTS

CN 1794265 6/2006
CN 101393599 3/2009
(Continued)

OTHER PUBLICATIONS

Patent Abstract of China, CN101393599, Game Role Control Method Based on Human Face Expression, Chinese Acad. Inst. Automation, Mar. 25, 2009.
(Continued)

*Primary Examiner* — Masud Ahmed
(74) *Attorney, Agent, or Firm* — McDonald Hopkins LLC

(57) ABSTRACT

Provided are a method and device for automatically playing an expression on a virtual image. The method includes the steps of: A, capturing a video image related to a game player in a game, and determining whether the captured video image contains a facial image of the game player, and if so, executing a step B; otherwise, returning to the step A; B: extracting facial features from the facial image, and obtaining a motion track of each of the facial features by motion directions of the extracted facial feature that are acquired for N times, where N is greater than or equal to 2; and C, determining a corresponding facial expression according to the motion track of the facial feature which is obtained in step B, and automatically playing the determined facial expression on a virtual image of the game player.

7 Claims, 2 Drawing Sheets

(51) Int. Cl.
*G06K 9/00* (2006.01)
*A63F 13/655* (2014.01)
*A63F 13/25* (2014.01)

(56) References Cited

U.S. PATENT DOCUMENTS

| | | | | |
|---|---|---|---|---|
| 2006/0251338 | A1* | 11/2006 | Gokturk | G06F 17/30253 382/305 |
| 2006/0253491 | A1* | 11/2006 | Gokturk | G06F 17/30256 |
| 2007/0011119 | A1* | 1/2007 | Thaler | G06K 9/6256 706/16 |
| 2009/0202114 | A1* | 8/2009 | Morin | A63F 13/12 382/118 |
| 2010/0007665 | A1* | 1/2010 | Smith | G06T 13/40 345/473 |
| 2010/0060722 | A1* | 3/2010 | Bell | G06F 3/017 348/51 |
| 2011/0064388 | A1* | 3/2011 | Brown | G06T 13/20 386/285 |
| 2011/0292181 | A1* | 12/2011 | Acharya | G06F 3/011 348/47 |
| 2011/0304629 | A1* | 12/2011 | Winchester | G06T 13/40 345/473 |
| 2012/0081282 | A1* | 4/2012 | Chin | G06F 3/011 345/156 |
| 2012/0254086 | A1* | 10/2012 | Deng | G06N 3/08 706/25 |

FOREIGN PATENT DOCUMENTS

| | | |
|---|---|---|
| CN | 101732055 | 6/2010 |
| CN | 101944163 | 1/2011 |
| JP | 2005056387 | 3/2005 |
| JP | 2011018362 | 1/2011 |
| WO | 2011156115 | 12/2011 |

OTHER PUBLICATIONS

Patent Abstract of China, CN101944163, Method for Realizing Expression Synchronization of Game Character Through Capturing Face Expression, Dexin Interaction Technology Beijing Co. Ltd., Jan. 12, 2011.

Patent Abstract of China, CN101732055, Method and System for Testing Fatigue of Driver, Beijing Zanb Technology Co. Ltd., Jun. 16, 2010.

Patent Abstract of China, CN1794265, Method and Device for Distinguishing Face Expression Based on Video Frequency, Beijing Zhongxing Microelect, Jun. 28, 2006.

International Search Report, PCT/CN2013/073131, May 30, 2013.

Korean Office Action for Korean Patent Application No. 9-5-2015-056530865, dated Aug. 20, 2015.

Japanese Office Action for Japanese Patent Application No. 2015-513910, dated Dec. 2, 2014.

Hiroaki Mori, et al.; Group Emotion Estimation using Baysian Network based on Face Expression and Prosodic Information; The Institute of Electronics, Information and Communication Engineers; Feb. 15, 2011; pp. 2-7/E; IEICE.

* cited by examiner

METHOD AND DEVICE FOR AUTOMATICALLY PLAYING EXPRESSION ON VIRTUAL IMAGE

CROSS-REFERENCES TO RELATED APPLICATIONS

The present application claims priority to International Application No. PCT/CN2013/073131, filed on Mar. 25, 2013, which claims priority to Chinese Patent Application No. 201210098817.8, filed on Apr. 6, 2012 and entitled "METHOD AND DEVICE FOR AUTOMATICALLY PLAYING EXPRESSION ON VIRTUAL IMAGE", the disclosures of all of which are incorporated herein by reference in its entirety.

TECHNICAL FIELD

The present disclosure relates to the field of computer technologies, in particular to a method and a device for automatically playing an expression on a virtual image.

TECHNICAL BACKGROUND

In the existing games, game players are generally provided with virtual personal images which may be dressed up. The virtual personal image of the game player is briefly called as an Avatar. In the game, the game player may click and select an expression representing his/her current mood through the predefined expression function to play the selected expression on his/her Avatar, so that the current mood of the game player can be known about by other game players. For example, the expression of happiness is clicked and selected through the predefined expression function by the game player and is played on the Avatar of the game player when the game player wins a game.

It can be seen that it is necessary for the game player to initiatively click and select an expression in the existing game. However, the game player typically has no time to initiatively click and select the expression during an actual game, thus the expression would not be played on the Avatar.

SUMMARY OF THE INVENTION

The embodiments of the present disclosure provide a method and a device for automatically playing an expression on a virtual image so as to realize playing an expression on a virtual image of the game player.

The technical solution of the present disclosure provided by the embodiments of the present disclosure includes:

a method for automatically playing an expression on a virtual image, including steps of:

A, capturing a video image related to a game player in a game, and determining whether the captured video image is a facial image of the game player, and if so, executing a step B; otherwise, returning to the step A;

B, extracting facial features from the facial image, and obtaining a motion track of each of the extracted facial features by motion directions of the extracted facial feature that are sequentially acquired for N times; where N is greater than or equal to 2; and C, determining a corresponding facial expression according to the motion track of the facial feature which is obtained in step B, and automatically playing the determined facial expression on a virtual image of the game player.

A device for automatically playing an expression on a virtual image, including: a capture unit, a track determination unit and an expression play unit; where The capture unit is configured to capture a video image related to a game player in a game, and determine whether the captured video image contains a facial image of the game player, and if so, send a notification to the track determination unit; otherwise, continue to capture the video image related to the game player in the game;

The track determination unit is configured to extract facial features from the facial image after receiving the notification sent by the capture unit, and obtain a motion track of each of the extracted facial features by motion directions of the extracted facial feature that are sequentially acquired for N times; where N is greater than or equal to 2; and The expression play unit is configured to determine a corresponding facial expression according to the motion track of the facial feature which is obtained by the track determination unit, and automatically play the determined facial expression on the virtual image of the game player.

As can be seen from the above technical solutions in the embodiments of the present disclosure, after the facial feature is extracted from the facial image of the game player which is captured during the game, the motion track of the facial feature is obtained from the motion directions of the facial feature that are sequentially acquired for N times, and the facial expression is determined from the motion track of the facial feature and then automatically played. Compared with the prior art in which the facial expression is initiatively clicked and selected by the game player, the present disclosure is advantageous in that, in one aspect, the facial expression can be automatically played on the virtual image such as the Avatar of the game player; in another aspect, the game player is freed from initiatively clicking the facial expression to be played, thereby saving the time of the game player.

DETAILED DESCRIPTION OF THE PREFERRED EMBODIMENTS

To make the purposes, technical solutions and advantages of the disclosure more clear, the disclosure will be further illustrated below in conjunction with the drawings and specific embodiments.

Figure 1:
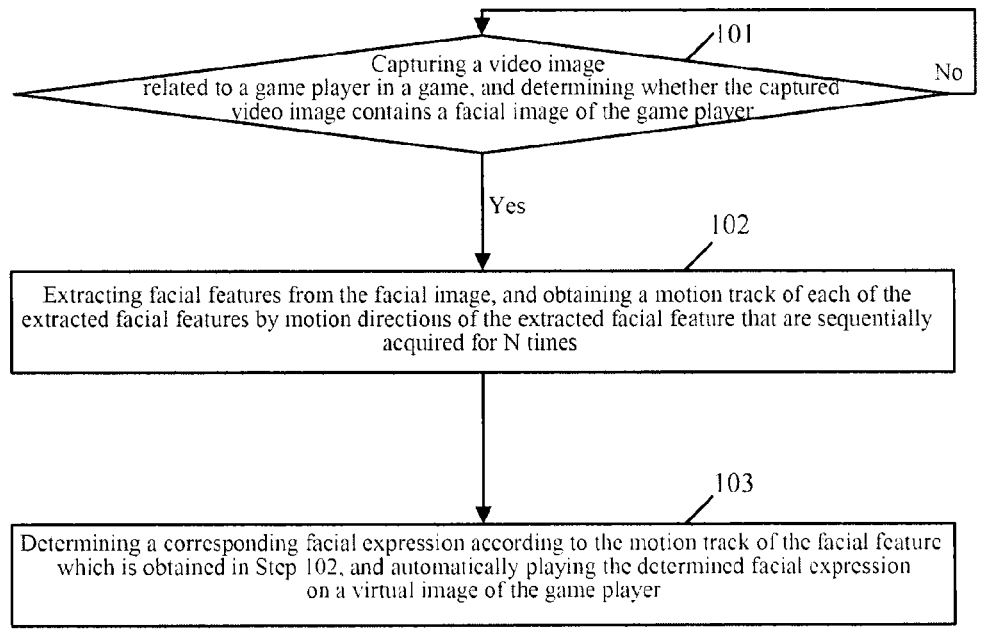
FIG. 1 is a flow chart of a method according to an embodiment of the present disclosure.

A method provided in the present disclosure includes the flow shown in FIG. 1.

Referring to FIG. 1 which shows a flow chart of the method according to an embodiment of the present disclosure, and the flow of the method includes the following Steps 101, 102 and 103.

Step 101: capturing a video image related to a game player in a game, and determining whether the captured video image contains a facial image of the game player, and if so, executing Step 102; otherwise, returning to Step 101.

Since the video images are transmitted in unit of frame, when each frame image is captured in Step 101, it is determined whether the captured frame image contains the facial image of the game player, and if so, Step 102 is executed; otherwise, the method proceeds to capture the next frame image.

Step 102, extracting facial features from the facial image, and obtaining a motion track of each of the extracted facial features by motion directions of the extracted facial feature that are sequentially acquired for N times.

Herein, N is larger than or equal to 2.

It should be illustrated herein that the extracting in Steps 102 and 101 can be achieved by the video capture technology.

Further, the extracting in Step 102 can be obtained by the face recognition technology.

Step 103: determining a corresponding facial expression according to the motion track of the facial feature which is obtained in Step 102, and automatically playing the determined facial expression on a virtual image of the game player.

As can be seen from Steps 101 to 103 in the present disclosure, after the facial feature is extracted by the face recognition technology from the facial image of the game player which is captured by the video capture technology during the game, the motion track of the facial feature is obtained from the motion directions of the facial feature that are sequentially acquired for N times, and the facial expression is determined from the motion track of the facial feature and then automatically played. Compared with the prior art in which the facial expression is initiatively clicked and selected by the game player, the present disclosure is advantageous in that, in one aspect, the facial expression can be automatically played on the virtual image such as the Avatar of the game player; in another aspect, the game player is freed from initiatively clicking the facial expression to be played, thereby saving the time of the game player.

Figure 2:
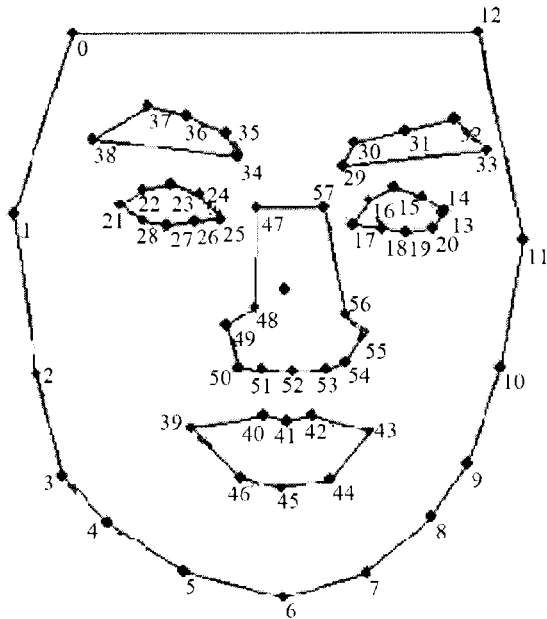
FIG. 2 is a schematic view of facial features according to the embodiment of the present disclosure.

Moreover, preferably, the facial features extracted in Step 102 of the present disclosure at least represent five facial parts of the game player, including eyebrows, eyes, nose, cheers and lips. Each of the five facial parts is represented by a plurality of feature vectors. As shown in FIG. 2, for example, each of the eyebrows is represented by five feature vectors formed by five feature points connected with each other.

Moreover, obtaining a motion track of each of the extracted facial features by motion directions of the extracted facial feature that are sequentially acquired for N times in Step 102 includes:

with respect to each of the extracted facial parts, sequentially acquiring feature vectors representing the extracted facial part for N times, and determining the motion track of the facial part according to the feature vectors representing the facial part that are acquired for N times. For example, if the facial feature is the nose, feature vectors representing the nose, i.e. vectors 47 to 57, are sequentially acquired for N times, and the motion track of the facial part is determined according to the vectors 47 to 57 acquired for N times. Herein, determining the motion track of the facial part according to the vectors 47 to 57 acquired for N times can be implemented through the existing manner of determining the track based on vectors.

Figure 3:
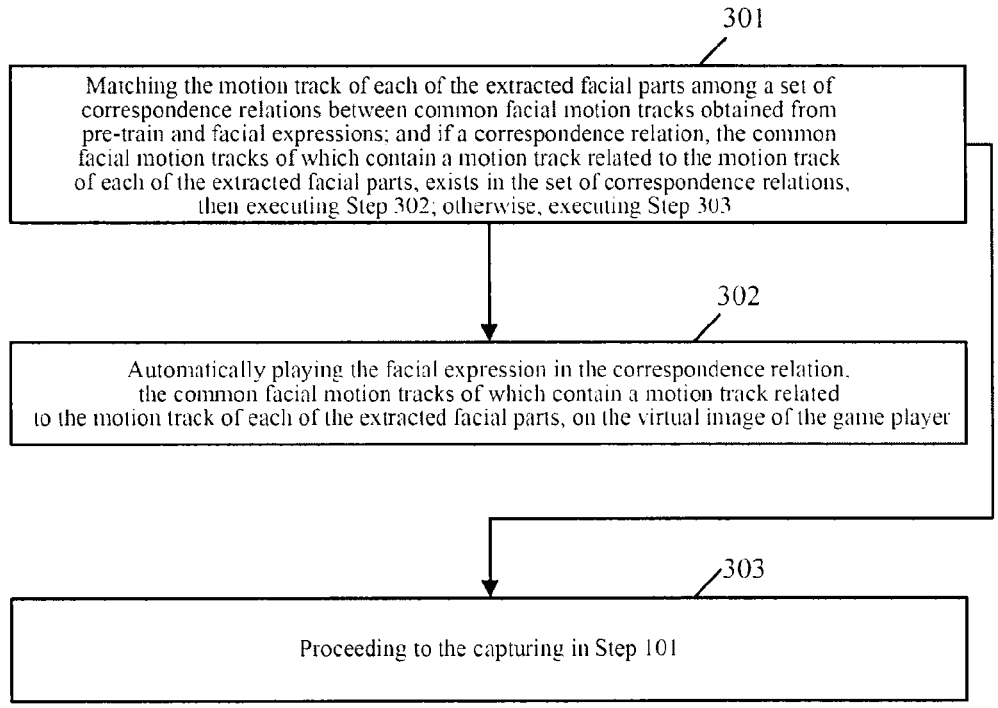
FIG. 3 is a flow chart showing the implementation of Step 103 according to the embodiment of the present disclosure.

Based on the description of Step 102, Step 103 may specifically include the flow as shown in FIG. 3.

Referring to FIG. 3 which is a flow chart showing the implementation of Step 103 according to the embodiment of the present disclosure and the flow of Step 103 includes the following Steps 301, 302 and 303.

Step 301: matching the motion track of each of the extracted facial parts among a set of correspondence relations between common facial motion tracks obtained from pre-train and facial expressions; and if a correspondence relation, the common facial motion tracks of which contain a motion track related to the motion track of each of the extracted facial parts, exists in the set of correspondence relations, then executing Step 302; otherwise, executing Step 303.

Preferably, in Step 301, the fact that the common facial motion tracks of a correspondence relation contain a motion track related to the motion track of each of the extracted facial parts include that:

with respect to the motion track of each of the extracted facial parts, the common facial motion tracks of the correspondence relation contain a facial motion track, a match rate of which with the motion track of the extracted facial part is larger than or equal to a match value corresponding to the extracted facial part. The match value corresponding to a facial part may be the same as or different from that of another facial part, which is not limited in the present disclosure.

Moreover, in Step 301, the set of correspondence relations between the common facial motions obtained from pre-train and the facial expressions is achieved by the following steps of:

with respect to a certain facial expression, such as smile, cry, pout or frown, acquiring and determining motion tracks of each of the facial parts in the case of the facial expression for multiple times;

with respect to each of the facial parts, extracting a common motion track from the determined motion tracks of the facial part in the case of the facial expression; and binding the common motion track of each of the facial parts with the facial expression together to form the correspondence relation between the common facial motion tracks and the facial expression.

Step 302: automatically playing the facial expression in the correspondence relation, the common facial motion tracks of which contain a motion track related to the motion track of each of the extracted facial parts, on the virtual image of the game player.

Step 303: proceeding to the capturing in Step 101.

As such, Step 103 is achieved through Steps 301 to 303.

Hereto, the method according to the present disclosure has been described, and the device of the present disclosure is described as follows.

Figure 4:
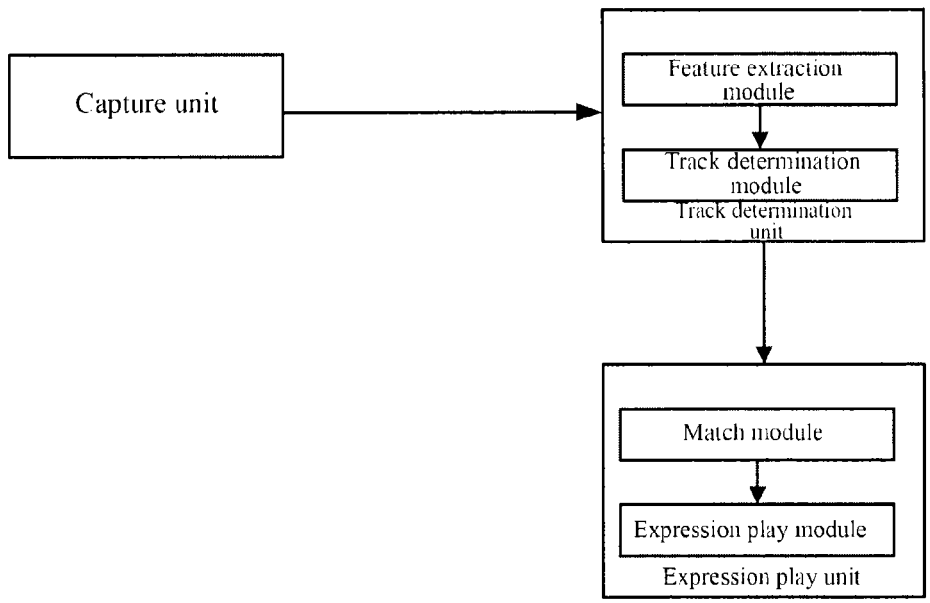
FIG. 4 is a schematic view showing the structure of a device according to the embodiment of the present disclosure.

Referring to FIG. 4 which is a schematic view showing the structure of a device according to the embodiments of the present disclosure, and the device is configured to automatically play a facial expression on the virtual image. The device includes a capture unit, a track determination unit and an expression play unit.

The capture unit is configured to capture a video image related to a game player in a game, and determine whether the captured video image contains a facial image of the game player, and if so, send a notification to the track determination unit; otherwise, continue to capture the video image related to the game player in the game.

The track determination unit is configured to extract facial features from the facial image after receiving the notification sent by the capture unit, and obtain a motion track of each of the extracted facial features by motion directions of the extracted facial feature that are sequentially acquired for N times; where N is greater than or equal to 2.

The expression play unit is configured to determine a corresponding facial expression according to the motion track of the facial feature which is obtained by the track determination unit, and automatically play the determined facial expression on the virtual image of the game player.

Preferable, as shown in FIG. 4, the track determination unit includes a feature extraction module and a track determination module.

The feature extraction module is configured to extract the facial features from the facial image captured by the capture unit, the extracted facial features at least represent five facial parts of the game player, and each of the facial parts is represented by a plurality of feature vectors.

The track determination module is configured to:

sequentially acquire feature vectors representing each of the facial parts extracted by the feature extraction module for N times; and determine the motion track of the facial part according to the feature vectors representing the facial part that are sequentially acquired for N times.

Preferably, as shown in FIG. 4, the expression play unit includes a match module and an expression play module;

The match module is configured to match the motion track of each of the extracted facial parts among a set of correspondence relations between common facial motion tracks obtained from pre-train and facial expressions; and if a correspondence relation, the common facial motion tracks of which contain a motion track related to the motion track of each of the extracted facial parts, exists in the set of correspondence relations, then send the notification to the expression play module.

The fact that the common facial motion tracks of a correspondence relation contain a motion track related to the motion track of each of the extracted facial parts includes that:

with respect to the motion track of each of the extracted facial parts, the common facial motion tracks of the correspondence relation contain a facial motion track, a match rate of which with the motion track of the extracted facial part is larger than or equal to a match value corresponding to the extracted facial part.

Moreover, preferably, the match module is further configured to trigger the capture unit to continue to capture the video image related to the game player in the game when the correspondence relation, the common facial motion tracks of which contain a motion track related to the motion track of each of the extracted facial parts, is not present in set of correspondence relations.

The expression play module is configured to automatically play the facial expression in the correspondence relation, the common facial motion tracks of which contain a motion track related to the motion track of each of the extracted facial parts, on the virtual image of the game player after receiving the notification.

Hereto, the device of the present disclosure has been described.

As can be seen from the above technical solutions in the present disclosure, after the facial feature is extracted from the facial image of the game player which is captured during the game, the motion track of the facial feature is obtained from the motion directions of the facial feature that are sequentially acquired for N times, and the facial expression is determined from the motion track of the facial feature and then automatically played. Compared with the prior art in which the facial expression is initiatively clicked and selected by the game player, the present disclosure is advantageous in that, in one aspect, the facial expression can be automatically played on the virtual image such as the Avatar of the game player; in another aspect, the game player is freed from initiatively clicking the facial expression to be played, thereby saving the time of the game player.

An embodiment of the present disclosure further provides a machine-readable storage medium containing an instruction set, which is configured to, when executed, instruct the machine to perform the method according to any one of the embodiments described above. The machine-readable storage medium may be a floppy, a hard disk, a compact disk (CD), and so on, and the machine may be a mobile phone, a personal computer, a server or a network equipment.

The preferable embodiments of the present disclosure have been described above, but are not intended to limit the present disclosure. Any modification, equivalent variation or improvement made without departing from the concept and principle of the present disclosure shall fall within the scope in the disclosure.

It should be noted that, with respect to the preceding embodiments of the method, the method is described as a series of combined actions for the sake of simple description. However, a person skilled in the art shall understand that the disclosure is not limited to the sequence of the actions, because some steps may be conducted in another sequence or simultaneously according to the disclosure. Further, it should be understood by a person skilled in the art that the embodiments described in the description are preferable, and the related actions and modules might be omitted in the disclosure.

Each of the embodiments described above contains different emphasis. For contents which are not described in detail in a certain embodiment, reference may be made to the related description in the other embodiment.

A person skilled in the art should understand that all or a part of the steps for implementing the above-mentioned embodiments of the method can be completed by hardware under instruction of program instructions, and the program may be stored in a computer-readable storage medium. The program, when executed, performs the steps in the embodiment of the method. The described storage medium includes a medium such as a ROM, a RAM, a floppy or a compact disk on which program codes are stored.

Finally, it should be noted that the embodiment described above are only exemplary and not intended to limit this disclosure; although this disclosure has been illustrated in detail referring to the preceding embodiments, a person skilled in the art should understand that the solution recorded in any of the preceding embodiments can be modified, or the partial technical features of the solution can be replaced equivalently.

The invention claimed is:

1. A method for automatically playing an expression on a virtual image, comprising steps of:

A: capturing, by a machine, a video image related to a game player in a game, and determining, by the machine, whether the captured video image contains a facial image of the game player, and if so, executing a step B; otherwise, returning to the step A;

B: extracting, by the machine, facial features from the facial image, and obtaining, by the machine, a motion track of each of the extracted facial features by motion directions of the extracted facial features that are sequentially acquired for N times; wherein N is greater than or equal to 2; and C: determining, by the machine, a corresponding facial expression according to the motion track of the facial feature which is obtained in step B, and automatically playing, by the machine, the determined facial expression on a virtual image of the game player;
and further comprising:
obtaining, by the machine, a set of correspondence relations between facial expressions and common facial motion tracks through pre-training;
wherein, the step C comprises:
C1: searching a correspondence relation from the set of correspondence relations, wherein the common facial motion tracks of the correspondence relation are related to motion tracks of the extracted facial features; and if the correspondence relation is searched, then executing a step C2;
C2: automatically playing the facial expression in the searched correspondence relation on the virtual image of the game player;
wherein, in the step C1, the fact that the common facial motion tracks of the correspondence relation are related to motion tracks of the extracted facial features comprises that:
a match between the motion track of each of the extracted facial features and a respective one of the common facial motion tracks is larger than or equal to a match value corresponding to the extracted facial features.

2. The method of claim 1, wherein, the facial features extracted in the step B at least represent five facial parts of the game player, and each of the facial parts is represented by a plurality of feature vectors;
obtaining a motion track of each of the extracted facial features by motion directions of the extracted facial feature that are sequentially acquired for N times in the step B comprises:
with respect to each of the extracted facial parts, sequentially acquiring feature vectors representing the extracted facial part for N times, and determining the motion track of the facial part according to the feature vectors representing the facial part that are acquired for N times.

3. The method of claim 1, wherein, in the step C1, when the correspondence relation is not present in set of correspondence relations, the method further comprises: proceeding to the capturing in the step A.

4. A device for automatically playing an expression on a virtual image, comprising: a capture unit, a track determination unit and an expression play unit, wherein,
the capture unit is configured to capture a video image related to a game player in a game, and determine whether the captured video image contains a facial image of the game player, and if so, send a notification to the track determination unit; otherwise, continue to capture the video image related to the game player in the game;
the track determination unit is configured to extract facial features from the facial image after receiving the notification sent by the capture unit, and obtain a motion track of each of the extracted facial features by motion directions of the extracted facial feature that are sequentially acquired for N times; where N is greater than or equal to 2; and
the expression play unit is configured to determine a corresponding facial expression according to the motion track of the facial feature which is obtained by the track determination unit, and automatically play the determined facial expression on the virtual image of the game player, wherein, the expression play unit comprises:
a match module, which is configured to search a correspondence relation from the set of correspondence relations, wherein the common facial motion tracks of the correspondence relation are related to the motion tracks of the extracted facial features; and if the correspondence relation is searched, then send a notification to an expression play module; wherein the set of correspondence relations are obtained through pre-training; and
the expression play module, which is configured to play the facial expression in the searched correspondence relation on the virtual image of the game player;
wherein, the fact that the common facial motion tracks of the correspondence relation are related to motion tracks of the extracted facial features comprises that:
a match between the motion track of each of the extracted facial features and a respective one of the common facial motion tracks is larger than or equal to a match value corresponding to the extracted facial features.

5. The device of claim 4, wherein, the track determination unit comprises:
a feature extraction module, which is configured to extract the facial features from the facial image captured by the capture unit, wherein the extracted facial features at least represent five facial parts of the game player, and each of the facial parts is represented by a plurality of feature vectors;
a track determination module, which is used to: with respect to each of the facial parts extracted by the feature extraction module, sequentially acquire feature vectors representing the facial part for N times; and determine the motion track of the facial part according to the feature vectors representing the facial part that are sequentially acquired for N times.

6. The device of claim 4, wherein, the match module is further configured to trigger the capture unit to continue to capture the video image related to the game player in the game when the correspondence relation, is not present in set of correspondence relations.

7. A non-transitory machine-readable storage medium on which an instruction set is stored, wherein the instruction set, when executed, is configured to instruct a machine to execute a method according to claim 1, the steps of the method comprising:
A: capturing a video image related to a game player in a game, and determining whether the captured video image contains a facial image of the game player, and if so, executing a step B; otherwise, returning to the step A;
B: extracting facial features from the facial image, and obtaining a motion track of each of the extracted facial features by motion directions of the extracted facial features that are sequentially acquired for N times; wherein N is greater than or equal to 2; and
C: determining a corresponding facial expression according to the motion track of the facial feature which is obtained in step B, and automatically playing the determined facial expression on a virtual image of the game player,
and further comprising:
obtaining, by the machine, a set of correspondence relations between facial expressions and common facial motion tracks through pre-training;
wherein, the step C comprises:
C1: searching a correspondence relation from the set of correspondence relations, wherein the common facial motion tracks of the correspondence relation are related to motion tracks of the extracted facial features; and if the correspondence relation is searched, then executing a step C2;

C2: automatically playing the facial expression in the searched correspondence relation on the virtual image of the game player;

wherein, in the step C1, the fact that the common facial motion tracks of the correspondence relation are related to motion tracks of the extracted facial features comprises that:

a match between the motion track of each of the extracted facial features and a respective one of the common facial motion tracks is larger than or equal to a match value corresponding to the extracted facial features.

\* \* \* \* \*